US00RE35409E

United States Patent [19]

Moore

[11] E Patent Number: Re. 35,409

[45] Reissued Date of Patent: Dec. 24, 1996

[54] ELECTRICALLY ADDRESSABLE OPTO-ELECTRONIC INDICATOR FOR MAKING DYNAMIC EVALUATIONS OF MICROSCOPIC OR LARGER SUBJECTS

[76] Inventor: Sidney D. Moore, 760 Mansfield Dr., Claremont, Calif. 91711

[21] Appl. No.: 165,015

[22] Filed: Dec. 6, 1993

Related U.S. Patent Documents

Reissue of:

[64] Patent No.: 4,720,804
Issued: Jan. 19, 1988
Appl. No.: 915,145
Filed: Oct. 3, 1986

U.S. Applications:

[63] Continuation-in-part of Ser. No. 638,896, Aug. 8, 1984, abandoned, which is a continuation-in-part of Ser. No. 422,823, Sep. 24, 1982, Pat. No. 4,531,052.

[51] Int. Cl.[6] ..... G02B 21/00; G06F 17/00

[52] U.S. Cl. ..... 364/525; 364/555; 33/298; 359/368

[58] Field of Search ..... 364/525, 555; 33/246, 248, 298; 348/79, 80, 136, 137; 356/247, 252, 372, 378; 359/54, 57, 59, 55, 368

[56] References Cited

U.S. PATENT DOCUMENTS

| | | | |
|---|---|---|---|
| Re. 32,437 | 6/1987 | Taniguchi et al. . | |
| 1,134,388 | 4/1915 | Kollmorgen . | |
| 2,159,394 | 5/1939 | Mellor et al. | 88/57 |
| 2,731,202 | 1/1956 | Pike | 235/92 |
| 3,161,716 | 12/1964 | Burris et al. | 88/32 |
| 3,212,422 | 10/1965 | Nerwin et al. | 95/44 |
| 3,336,831 | 8/1967 | Unertl, Jr. | 88/1 |
| 3,431,652 | 3/1969 | Leatherwood | 33/50 |
| 3,486,432 | 12/1969 | Norwood | 95/44 |
| 3,581,002 | 5/1971 | Dodds | 178/7.84 |
| 3,684,376 | 8/1972 | Lessard | 356/21 |

(List continued on next page.)

FOREIGN PATENT DOCUMENTS

| | | |
|---|---|---|
| 2201481 | 4/1974 | France . |
| 50-18247 | 2/1975 | Japan . |
| 50-98836 | 8/1975 | Japan . |
| 52-14699 | 4/1977 | Japan . |
| 52-112832 | 8/1977 | Japan . |
| 52-110626 | 9/1977 | Japan . |

(List continued on next page.)

OTHER PUBLICATIONS

"Prototype Liquid Crystal Reticle" Gilbert et al, Hughes Aircraft, Culver City, CA (Aug. 1979).

"Optical Sights to Use Liquid Crystal Device," *Hughes News*, vol. 39, No. 1, pp. 1–6 (Jan. 11, 1980).

*Defense Electronics*, vol. 12, No. 5, cover page (May 1980).

*Primary Examiner*—Ellis B. Ramirez
*Attorney, Agent, or Firm*—Christie, Parker & Hale, LLP

[57] ABSTRACT

A computer controlled image forming apparatus for making quantitative evaluations relating to an image of a subject which is programmed to control a plurality of associated electrically addressable indicia the images of which are viewable superimposed upon the image of the subject. The device is usable for measuring distances, areas, angles, curves, and the like, and is controllable by an operator who, by means of first signals input into the computer, selectively addresses particular members of the plurality of indicia by means of second signals output by the computer and conditioned by interface circuitry in a manner to quantitatively relate the addressed indicia to the image of the subject. Subsequently, the computer interprets the finally addressed indicia in terms of a physical parameter exhibited by the image of the subject for which the computer has been programmed and outputs results of the computations, in the form of third signals, or display to the operator.

The questions raised in reexamination request No. 90/003, 389 filed Apr. 6, 1994, and 90/003,772 filed Mar. 29, 1995, have been considered and the results thereof are reflected in this reissue patent which constitutes the reexamination certificate required by 35 U.S.C. 307 as provided in 37 CFR 1.570(e).

18 Claims, 5 Drawing Sheets

U.S. PATENT DOCUMENTS

| | | | |
|---|---|---|---|
| 3,781,080 | 12/1973 | Aftergut | 350/336 |
| 3,884,584 | 5/1975 | Tsunekawa et al. | 356/226 |
| 3,885,861 | 5/1975 | Farnsworth et al. | 350/160 LC |
| 3,895,866 | 7/1975 | de Quervain et al. | 353/120 |
| 3,922,532 | 11/1975 | Kitchener et al. | 235/150.3 |
| 3,945,023 | 3/1976 | Stauffer | 354/25 |
| 3,958,117 | 5/1976 | Stauffer | 250/201 |
| 3,961,348 | 6/1976 | Miyazaki | 354/289 |
| 4,020,324 | 4/1977 | Buscher et al. | 235/61.5 S |
| 4,054,372 | 10/1977 | Schröeder | 350/186 |
| 4,054,782 | 10/1977 | Weibel | 364/555 |
| 4,071,891 | 1/1978 | Barrows | 364/416 |
| 4,099,881 | 7/1978 | Van den Broek et al. | 356/171 |
| 4,135,815 | 1/1979 | Masunaga et al. | 356/4 |
| 4,140,378 | 2/1979 | Suzuki et al. | 354/53 |
| 4,142,786 | 3/1979 | Suzuki et al. | 354/32 |
| 4,162,124 | 7/1979 | Feldman et al. | 356/4 |
| 4,202,037 | 5/1980 | Glaser et al. | 364/525 |
| 4,207,594 | 6/1980 | Morris et al. | 358/107 |
| 4,247,161 | 1/1981 | Unertl, Jr. | 350/10 |
| 4,299,462 | 11/1981 | Suzuki et al. | 354/53 |
| 4,300,826 | 11/1981 | Aoki et al. | 354/60 L |
| 4,303,340 | 12/1981 | Hoffman | 356/372 |
| 4,309,091 | 1/1982 | Fukuhara et al. | 354/31 |
| 4,313,657 | 2/1982 | Tokutomi et al. | 354/53 |
| 4,314,750 | 2/1982 | Orban | 354/198 |
| 4,319,813 | 3/1982 | Aoki et al. | 354/25 |
| 4,331,132 | 5/1982 | Mukasa | 358/98 |
| 4,341,451 | 7/1982 | Krueger et al. | 354/289 |
| 4,345,249 | 8/1982 | Togashi | 350/336 |
| 4,354,754 | 10/1982 | Takahashi et al. | 354/289 |
| 4,391,500 | 7/1983 | Tsunekawa | 354/31 |
| 4,441,798 | 4/1984 | Watanabe et al. | 354/483 |
| 4,445,757 | 5/1984 | Enomoto et al. | 350/429 |
| 4,465,355 | 8/1984 | Murakami et al. | 354/475 |
| 4,473,919 | 10/1984 | Fritz, Jr. | 15/250.4 |
| 4,475,800 | 10/1984 | Kinoshita et al. | 354/406 |
| 4,478,493 | 10/1984 | Yokota | 350/336 |
| 4,483,602 | 11/1984 | Aoki et al. | 354/402 |
| 4,509,848 | 4/1985 | Katsuma et al. | 354/473 |
| 4,531,052 | 7/1985 | Moore | 364/561 |
| 4,534,639 | 8/1985 | Konishi et al. | 354/432 |
| 4,572,617 | 2/1986 | Masaki et al. | 350/339 R |
| 4,589,030 | 5/1986 | Uley | 358/225 |
| 4,603,966 | 8/1986 | Brownstein | 358/93 |
| 4,627,700 | 12/1986 | Nakamura et al. | 354/409 |
| 4,711,547 | 12/1987 | Iiuzka | 354/471 |
| 4,777,352 | 10/1988 | Moore | 235/404 |
| 4,812,912 | 3/1989 | Iida et al. | 358/227 |
| 4,827,303 | 5/1989 | Tsuboi | 354/403 |
| 4,856,869 | 8/1989 | Sakata et al. | 350/162.18 |
| 4,884,089 | 11/1989 | Tanaguchi et al. | 354/222 |
| 4,965,439 | 10/1990 | Moore | 235/404 |

FOREIGN PATENT DOCUMENTS

| | | |
|---|---|---|
| 52-119227 | 10/1977 | Japan . |
| 53-28730 | 3/1978 | Japan . |
| 53-12593 | 4/1978 | Japan . |
| 53-75132 | 6/1978 | Japan . |
| 53-98853 | 8/1978 | Japan . |
| 53-119936 | 9/1978 | Japan . |
| 54-13332 | 1/1979 | Japan . |
| 54-106225 | 8/1979 | Japan . |
| 55-18214 | 2/1980 | Japan . |
| 55-36839 | 3/1980 | Japan . |
| 55-10982 | 3/1980 | Japan . |
| 57-4705 | 2/1981 | Japan . |
| 56-74425 | 6/1981 | Japan . |
| 56-106636 | 8/1981 | Japan . |
| 56-151923 | 11/1981 | Japan . |
| 57-8530 | 1/1982 | Japan . |
| 57-3229 | 1/1982 | Japan . |
| 57-89741 | 6/1982 | Japan . |
| 57-116311 | 7/1982 | Japan . |
| 57-135937 | 8/1982 | Japan . |
| 57-161708 | 10/1982 | Japan . |
| 57-204028 | 12/1982 | Japan . |
| 58-62626 | 4/1983 | Japan . |
| 58-107520 | 6/1983 | Japan . |
| 58-105532 | 7/1983 | Japan . |
| 58-116527 | 7/1983 | Japan . |
| 58-140728 | 8/1983 | Japan . |
| 58-184114 | 10/1983 | Japan . |
| 58-168027 | 10/1983 | Japan . |
| 58-166330 | 10/1983 | Japan . |
| 59-5222 | 1/1984 | Japan . |
| 59-114522 | 7/1984 | Japan . |
| 59-151120 | 8/1984 | Japan . |
| 59-151119 | 8/1984 | Japan . |
| 59-151121 | 8/1984 | Japan . |
| 62-35072 | 9/1987 | Japan . |

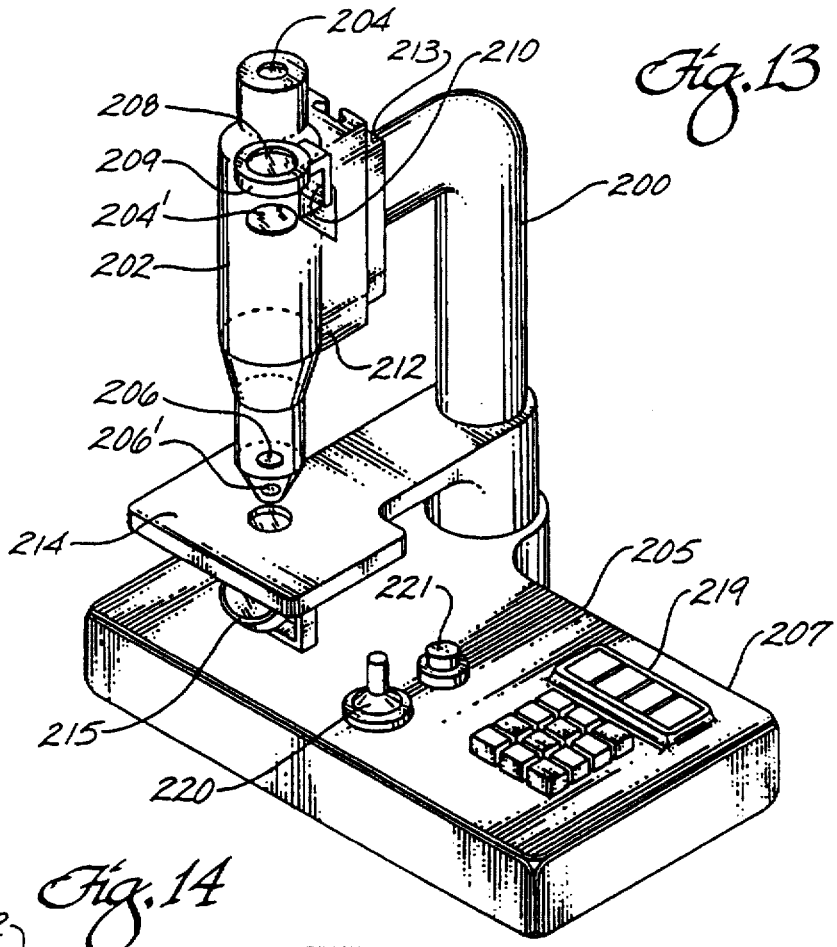
Fig. 13
Fig. 14
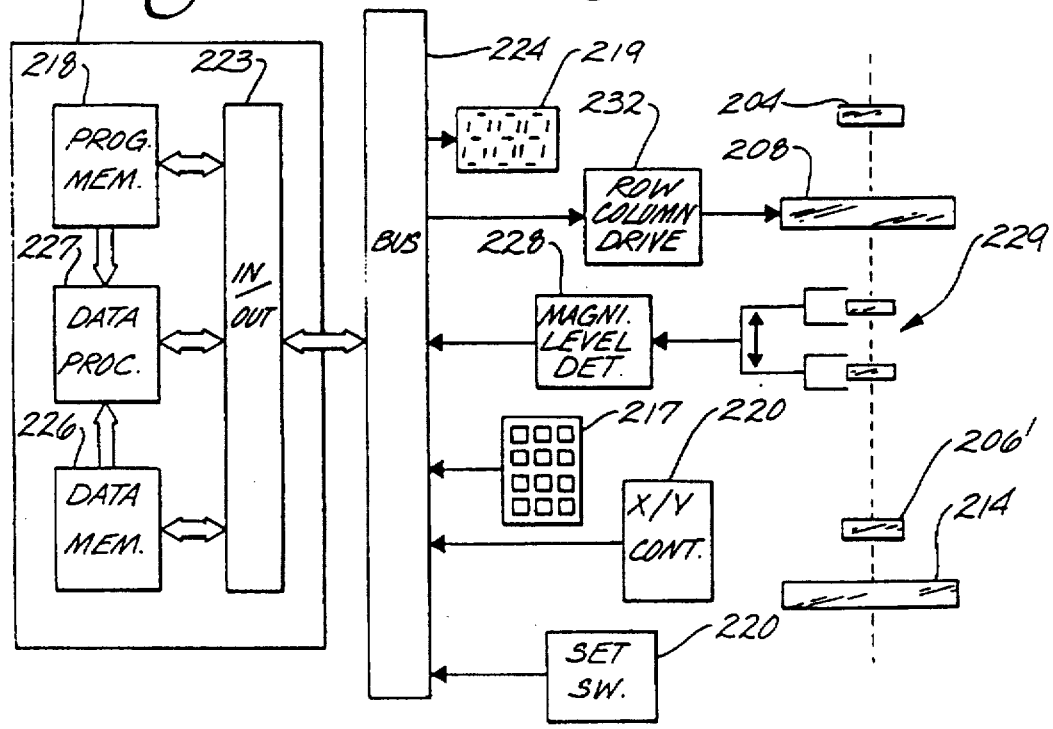

ELECTRICALLY ADDRESSABLE OPTO-ELECTRONIC INDICATOR FOR MAKING DYNAMIC EVALUATIONS OF MICROSCOPIC OR LARGER SUBJECTS

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation-in-part of parent U.S. patent application Ser. No. 06/638,896, filed Aug. 8, 1984, and now abandoned[.], *which is a continuation-in-part of grandparent U.S. patent application Ser. No. 06/422,823, filed Sep. 24, 1982, now U.S. Pat. No. 4,531,052, issued Jul. 23, 1985.*

FIELD OF THE INVENTION

The present invention relates to measuring reticles for image-forming measuring devices, and more particularly to reticles used in optical magnifying devices, such as optical microscopes, for making quantitative measurements, such as the counting of units in a sample, and for measuring linear distances and areas. Application for devices of the present invention are found in the biological and material sciences, and in the practical arts of engineering, surveying, and the like.

BACKGROUND OF THE INVENTION

Devices of the prior art for the quantitative analysis of biological, minerlogical, metallurigical samples, and the like, are specifically dedicated elaborate automatic instruments which utilize video scan cameras and various schemes to automatically interpret and display video signals. The two primary measurement parameters are size and density of cells within a sample. The more versatile of instruments of this class are exemplified by the device of U.S. Pat. No. 3,922,532, Kitchener, which provides a video monitor with manual controls whereby an operator may intervene to make judgments in ceases of indefinite measurement. The primary advantage of these devices is their rapid automatic operation in evaluating large numbers of samples. This is of great importance in hospitals and research facilities where large numbers of specimens must be examined. In large facilities such as these the extremely high initial cost and ongoing maintenance expenses of such elaborate permanently installed devices are justifiable. However, small hospitals, clinics, and individual medical practitioners usually do not have access to, nor need of, such complex instruments. And the high purchase cost of these devices is prohibitive in economically depressed areas of the world, to small hospitals, and to individuals in private practice.

Furthermore, the devices of the prior art as exemplified by U.S. Pat. No. 3,922,532, Kitchener, and U.S. Pat. No. 2,731,202. Pike, do not descriminate among elements of a sample with the precision of a trained operator. Thus, with these devices, direct human intervention is often required. Recognizing this limitation, designers of the more sophisticated devices have provided means for identifying ambiguous measurements for subsequent operator evaluation. In light of the requirement of human intervention and judgment, a further disadvantage exists in that the human evaluator is required to examine a video display of the image of the sample. A video image is normally lower in resolution than is an original optical image formed by the microscope from which the video camera derives its electronically-produced image. Subtlety of texture and color in the specimen are distorted in video images, making such devices of limited use in many applications and entirely useless in others.

An example of current research in which the devices of the prior art would find little or no use is the work relating to the fruit fly. In this research it is necessary to discern minute variations in order to properly identify the eight known phenotypes of the insect. No fully automatic scanning device of the prior art could accomplish this task. The method used is laborious and is as follows: A quantity of fruit flies is distributed upon a slide and placed upon the stage of a dissecting microscope. While observing the sample by means of the microscope, a technician, with the aid of a tiny brush, physically separates the flies into individual piles, one for each phenotype. Afterwards, the technician counts the number of flies in each pile and records the number of each phenotype in the sample.

In the fields of material sciences and engineering there exist optical measuring instruments such as optical comparators, optical micrometers, and measuring microscopes. One class of these prior art devices is on the order of an illuminated projector which displays upon a frosted translucent screen a magnified silhouette of the object to be measured. In most such prior art devices, indexed knobs control the disposition of the object mounted on a movable stage relative to markings upon the face of the screen to bracket the image of the object to be measured. After such bracketing the operator interprets the knob settings as with conventional hand-held micrometers to determine the value of the measurement. In optical projectors transparent overlay templates may be placed upon the translucent viewing screen. The templates bear one or a number of a variety of patterns to be used as a comparison to the sample under evaluation. For example, U.S. Pat. No. 4,054,782, Weibel, utilizes a variety of grid patterns in a device of this type.

Another and portable class of static optical measurement devices includes table-supported and handheld magnifying instruments featuring static reticles physically divided into grids, lines, and so forth, of precise dimensions. In this class are measuring microscopes and comparators. In some devices of this class an operator manually counts the number of grid elements required to span the sample, or, if the sample is smaller than a single grid element, the operator interpolates the percentage of the unit space spanned by the sample.

Other devices of this class for evaluating samples comprising a plurality of subjects such as biological cells provide a static array of a variety of population densities of the particular subject. Comparison of the array to the actual sample provides a rough approximation of the population density of the sample.

The primary disadvantage of these prior art devices is that the complex density of their static pattern often obscures the image of the sample, making accurate measurements difficult and confusing. The static display also requires the operator to manually count the number of measuring units spanned by the subject, an operation which is time consuming and prone to error.

The static use of a liquid crystal display (LCD) as a graticule of oscilloscopes is disclosed in U.S. Pat. No. 3,581,002, Dobbs, wherein a set of individually selectable static LCD graticules is provided to assist an operator in the evaluation of data displayed by a measuring oscilloscope.

And U.S. Pat. No. 3,781,080, Aftergut, discloses the use of an LCD as a static reticle for optical equipment having two or more levels of magnification. In this invention each selectable static reticle pattern relates to a specific magnification level.

SUMMARY OF THE INVENTION

There is, therefore, set forth according to the present invention, an optical device which provides active, quantitative evaluation of a specimen in conjunction with dedicated computer circuitry or as a peripheral input into an existing computer.

Toward this end the device includes means for projecting an image of the specimen along an image path. These projecting means may simply be optics which magnify an image of the specimen in the manner of a microscope or telescope. Means are provided for superimposing indicia into the image path for simultaneous viewing with the specimen. The indicia may include an arrangement of a liquid crystal display (LCD) or other display in line or dot picture elements (pixels) which, in response to electrical or magnetic stimuli, are transformable between a condition of continuous transparency or opaqueness.

Processor means such as an existing personal computer or a dedicated processor are provided for interfacing with and addressing the pixels to impose electromagnetic stimuli to selected pixels and thereby superimpose the selected pixels onto the image of the specimen. These processor means may also determine quantitative information regarding the specimen by processing the positions of the selected pixels with perhaps other information such as magnification and the like.

Accordingly, the device of the present invention can be used to mark, flag or count by addressing a corresponding pixel and providing stimuli thereto to create, for example, an opaque dot superimposed over the item to be flagged, marked or counted. For counting, the processor means tabulates and, if desired, determines distribution.

Importantly, the device can also be used to circumscribe, bracket or otherwise relate to the specimen. The processor may determine, quantitative values from the aforesaid operations.

BRIEF DESCRIPTION OF THE DRAWINGS

FIG. 13 is a perspective view of a further embodiment of the present invention; and FIG. 14 is a blank diagram of the logic for the embodiment of FIG. 13.

DETAILED DESCRIPTION

Figure 1:
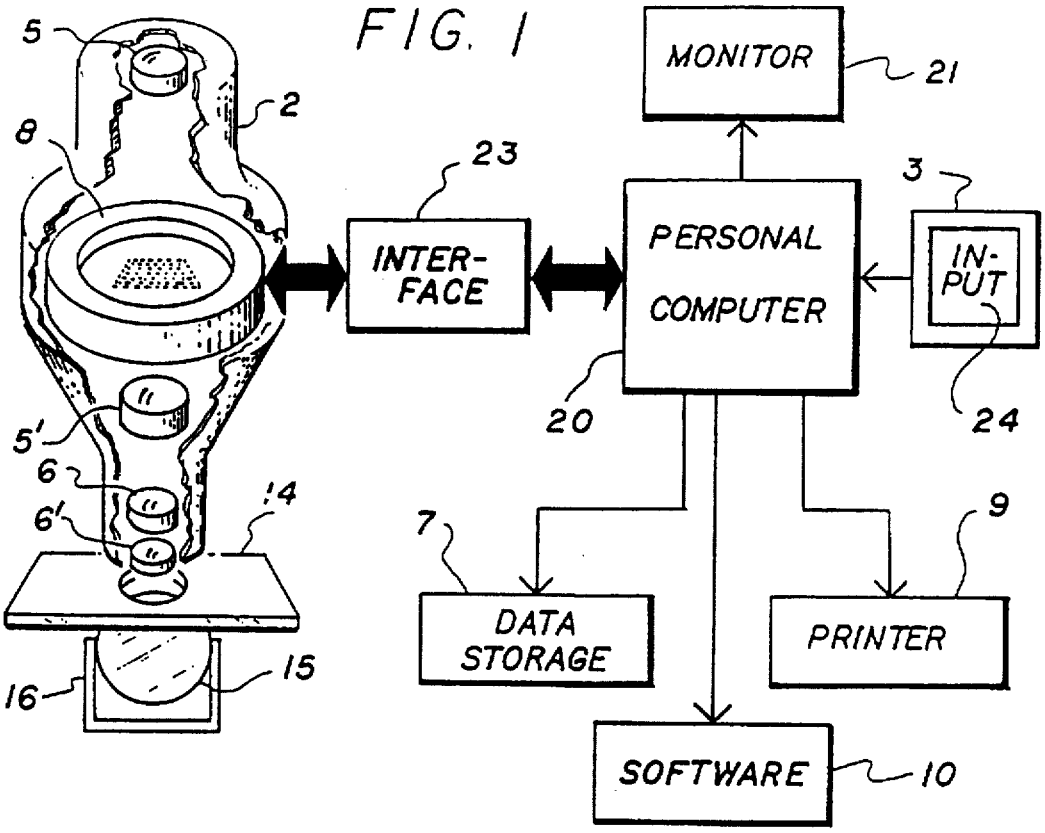
FIG. 1 is a block diagram of the instant invention embodying an opto-electronic indicator in cooperation with optical elements of the device and interfaced to a personal computer and its peripheral devices.

In the following description reference is made to movable pixels, dots, lines, or line segments of an optoelectronic indicator. Actual movement of these elements does not occur; it is only apparent and is suggested by the sequential and momentary addressing of the successive elements of the display array by means of signals from a controlling processor. The effect is that of a single moving element or streaming line somewhat similar to the apparent motion in video display monitors such as television and other video devices. Active control afforded by the instant invention allows an operator to electrically address indicia of the opto-electronic indicator in response to particular individual characteristics of the subject or subjects being examined.

It is also to be understood that the term "reticle" as used herein is not limited in meaning to an element physically present upon the focal plane of an optical apparatus. It also is meant to include other means for producing visible indicia thereupon, such as secondary image forming optical means in combination with a beam splitter, and the like.

Referring more particularly to the drawings by characters of reference, FIG. discloses a device 1 embodying the present invention having housing 2 (in cutaway view to reveal internal components) wherein an image forming means comprising ocular lens S, intermediate lens 5', and objective lenses 6 and 6', are axially aligned to define an optical path through the housing. The apparatus defines an optical magnifying device on the order to a conventional microscope having a compound optical system.

Disposed transversely on the axis between lenses 5 and 5', and on the intermediate plane of focus of these lenses, is electromagnetic superimposing means shown as an addressable opto-electronic indicator 8, hereinafter referred to as indicator 8. To control the functions of indicator 8, a processor shown as personal computer 20 to which the device is connected via interface 23 is provided. Indicia of indicator 8, which will be fully described with reference to later figures of drawing, form a matrix of pixels in a planar field controllable by means of second signals output from personal computer in response to first signals input by an operator into personal computer 20. Personal computer 20 not only provides the primary means by which individual pixels of indicator 8 are controlled by providing electromagnetic stimuli thereto but serves, as well, to perform a variety of calculations relating to quantitative parameter of subjects under evaluation. Second signals output from personal computer 20 are conveyed to interface 23. These second signals from personal computer 20 are conditioned by interface 23 and thence conveyed to indicator 8 to selectively address elements thereof and direct stimuli thereto. Personal computer 20 constantly monitors the conditions present in indicator 8 and, dependent upon subsequent commands from the operator, performs quantitative evaluations based upon predetermined programming parameters previously loaded into the computer's random access memory. In a typical application this operational program data may be loaded from a storage medium such as floppy disk, tape, rom cartridge, or the like. It will be appreciated, therefore, that it is possible to apply the described hardware combination to a wide variety of quantitative measurement functions entirely unrelated to one another simply by changing the programming parameters. Thus, the present invention lends itself to the performance of many and diverse tasks.

Beneath aperture stage 14 is pivotable mirror 15 supported upon frame 16. Mirror 15 gathers and directs light upward through the aperture of stage 14 as is common in microscopes of this class. Alternatively, an illuminator unit, or other light source, may be utilized.

The conventional keyboard of personal computer 20 serves to set into memory measurement parameters selected by an operator and to set flags and counters (pixels) relative to the image of the subject being evaluated. Associated software 10 configures the computer's memory for these functions and formats the computer's output of third signal to interface 13 and conventional video monitor 21 so that both indicator 8 and monitor display pertinent data resulting from the operation being conducted.

Input device a may be a touch pad or graphics tablet device which, together with computer 20, software 10, interface 23, and indicator 8, operates by standard Cartesian coordinate principles. Typical of available devices of this type are available under the trademark True Grid for digitizer tablets manufactured by Houston Instrument, of Austin, Tex. Alternatively, peripheral input device 3 may be in the form of a mouse or joystick.

Active surface 24 of input device 3 is the equivalent of the active area of indicator 8 and of the green of monitor 21. When an operator applies a transducer, such as a stylus, to active surface 24, a first signal is generated to personal computer 20 which outputs an appropriate second address signal to indicator 8 to stimulate a corresponding pixel thereof. Personal computer 20 is programmed, as previously mentioned, to scan the input signals from input device 3 to determine the logic levels of the signals coming therefrom, in a manner well known in the art of digital logic design, in order to properly address selected pixels of indicator 8.

After the operator has finished activly selecting indicia of indicator 8 to relate in a quantitative manner to the image of the evaluation subject, he or she enters an "end of function" signal to computer 20 which instantaneously computes a desired quantitative value. This operation and its results may be saved to data storage device 7 and/or printed by means of printer 9.

There are numerous other means by which control signals may be produced and utilized by personal computer 20. However, the described means sufficiently illustrate how this task might be performed by a preferred method commonly available in the art.

Figure 2:
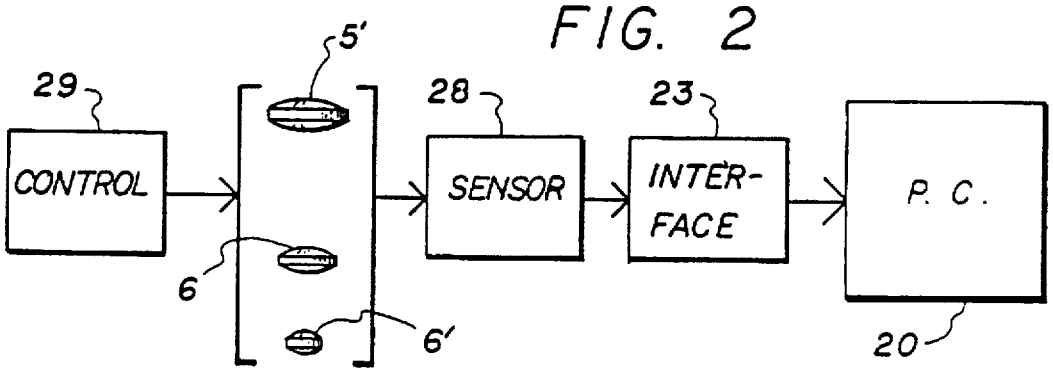
FIG. 2 is a block diagram of an alternative structure for portions of the device of FIG. 1 wherein the optical elements are positionally variable in order to alter the degree of magnification of the instrument.

FIG. 2 depicts a variant of the device of FIG. 1. In this device the optical configuration is variable by the operator to provide a range of magnification levels. The device of FIG. 2 has variable magnification sensor 28 which monitors changes in the magnification induced by adjustments made therein by the operator by means of manipulation of control 29. Changes in the positioning of the optical elements cause proportionate changes in the signal from magnification level sensor 28 which are conducted to personal computer 20. These changes are integrated by personal computer 20 into subsequent computations having to do with measurements of subject size, distance, span, or other quantitative parameters being measured, in order to compensate for changes in image magnification in devices of the present invention which embody this feature.

Control 29 may be of any suitable mechanical configuration to provide positive positioning of the variable optical components. Commonly, this is accomplished by means of a control ring interconnected to a camming arrangement which, in turn, determines the positions of the various optical components.

Sensor 28 may comprise one of a number of available position transducers which convert mechanical movement into an electrical signal. Transducers of this type range from simple potentiometers to sensitive BCD shaft encoders which output discrete binary-coded signals for very slight changes in the rotational positions of their shafts.

An inexpensive and positive means for tracking the magnification level in the instant device is to provide a series of, perhaps, three to five positive magnification settings, each of which causes a simple resistive, or switching, transducer to output a corresponding three to five signal levels to interface 23. This arrangement provides the greatest precision with the least cost since substantial deviations in signal level will be ignored by personal computer 20 so long as the signal is within a certain, tolerable, range.

Figure 3:
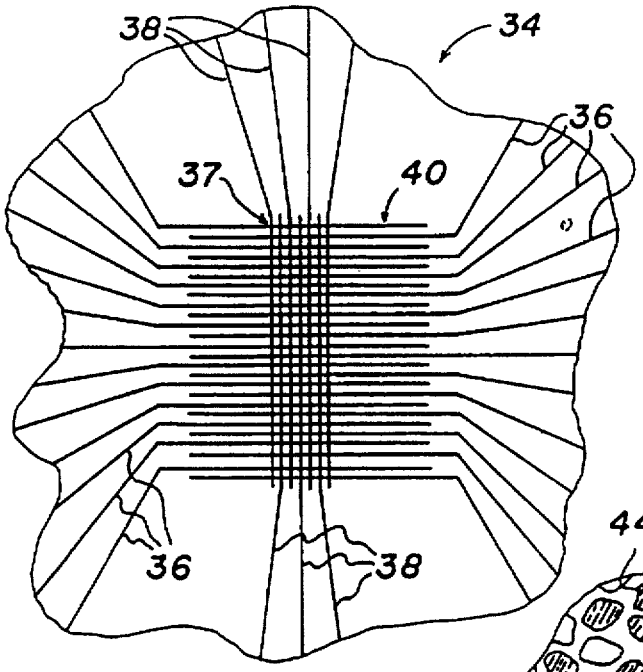
FIG. 3 is a detail of the layout of conductive deposits of a pixel matrix version of an embodiment of the present invention.

With reference to FIG. 3, the layout or pattern of indicator 8 is generally shown as 34. Active viewing area 40 consists of a Cartesian coordinate matrix of vertically disposed parallel interdigitated lines 38 and horizontally disposed parallel interdigitated lines 36, all shown few in number and spaced apart for clarity. A dot or pixel 37 is formed at each intersection of a line 36 with a line 38. A stimulus, either an electric potential or a magnetic field, provided at the intersection of a selected vertical line 38 with a selected horizontal line 36 causes the associated pixel to transform between the condition of continuous transparency or opacity. Any number of the plurality of intersections may be so addressed at any one time, if desired, in order to form a continuous line, whether regular or irregular in form. The physical structure of the indicator depicted in FIG. 3 is identical to that of FIG. 6 which structure will be detailed subsequently with reference to FIG. 6.

Figure 4:
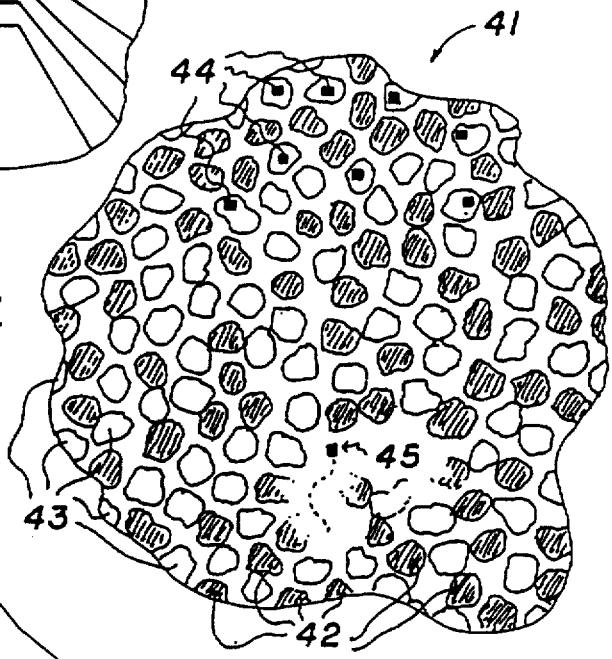
FIG. 4 is a view through the device of FIG. 1 equipped with the embodiment of FIG. 3 showing images of subjects in a sample being flagged for cumulative counting.

FIG. 4 discloses a, portion of a typical though, simplified, field of view provided by a device of the present invention, shown generally as 41, depicting a sample comprising subjects 42 and 43. Dots or pixels are shown in association with subjects 43 as markers or flags thereof, all shown few in number for clarity. Active pixel 45 is controllable by an operator by means of input device 3 (FIG. 1) to move about over the field of view at the discretion of the operator who may direct its movement to an unmarked subject 43 by manipulation of input device 3 (FIG. 1). Upon arriving at an unmarked subject 43, pixel 45 is made to be fixed positionally thereon by an appropriate input signal from an operator such as the pressing of a particular dedicated key of the computer's keyboard so as to mark, or flag, the subject 43 in the fashion indicated by fixed marker pixels 44. Upon the flagging of a subject 43 in this manner personal computer 20 (FIG. 1) adds a count to the cumulative total displayed by monitor 21 (FIG. 1) to provide an ongoing tally of the number of subject 43 which have been counted.

Personal computer 20 (FIG. 1) may also compute and output to monitor 21 (FIG. 1) information such as quantity per unit of measure, area of a space outlined by a stream of pixels, or the like, at the discretion of the operator and depending upon the measurement requirements and software parameters.

Figure 5:
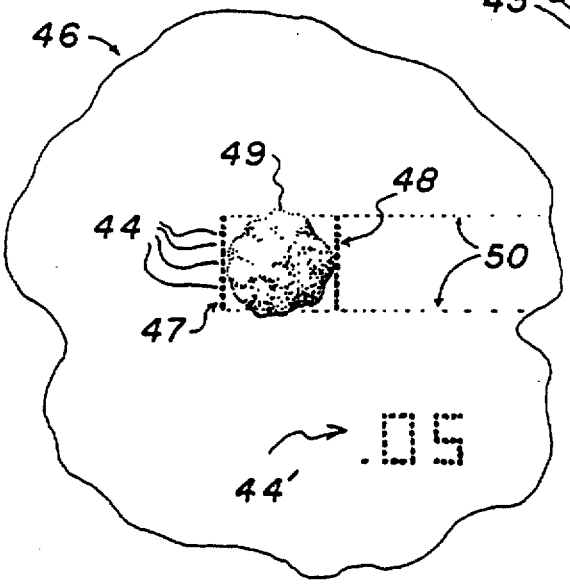
FIG. 5 is a view provided by the device of FIG. 1 wherein the function of the device has been changed to measure a linear distance.

FIG. 5 discloses a portion of yet another typical field of view of a device of the present invention shown generally as 46. However, FIG. 5 depicts an alternative to the counting mode shown in FIG. 4. The function of the apparatus in this mode is distance measurement rather than counting. The choice of mode is selectable at the discretion of the operator by means of appropriate data entered into personal computer 20 (FIG. 1). It is to be noted that dedicated single function devices of the present invention would not provide mode selection. Such devices would be simpler in construction and less costly to manufacture.

In FIG. 5, line segments 47 and 48 are comprised of pixels 44 of a dot matrix such as that depicted in FIG. 3. Line 47 is a stationary reference while line 48 is active over the area indicated by dotted line enclosure 50. The position of line 48 is controlled by the operator by means of input device 3 (FIG. 1). It is to be noted that while in the counting mode input device 3 functions to control both the vertical and the horizontal dispositions of active pixel 45 (FIG. 4), but in the measuring mode of FIG. 5 a single axis is available to operator control. For clarity of description throughout this specification it will be assumed that the controllable axis is the X axis (horizontal) as depicted in FIG. 5. Thus, manipulation of appropriate keys of personal computer 20, or activation of input device 3, may cause active line 48 to move to the right away from stationary line 47 or the left toward stationary line As depicted in FIG. 5, stationary line 47 is tangent to one edge of subject 49 while active line 48 has been made by the operator to be tangent to the opposing edge. Thus, the distance between line segments 47 and 48 is directly related to a dimension of sample subject 49. Personal computer 20 is programmed to account for the relative size difference between elements of indicator 8 and the magnified image of the subject under evaluation. It is important to note that the distance between line segments 47 and 48 may be depicted within the field of view of the apparatus, by indicia displayed in numeric form adjacent active area 50, within the field of view of the apparatus, shown here as numeric value 44'.

It is also to be noted that pixels 44 making up line segments 47 and 48, and any additional addressable indicia, as well as those of FIG. 4 which function as counting flags 45, are all component elements of a dot matrix similar to that shown earlier in simplified form in FIG. 3. Preliminary field programming by an operator determines which of the available modes will be implemented.

Figure 6:
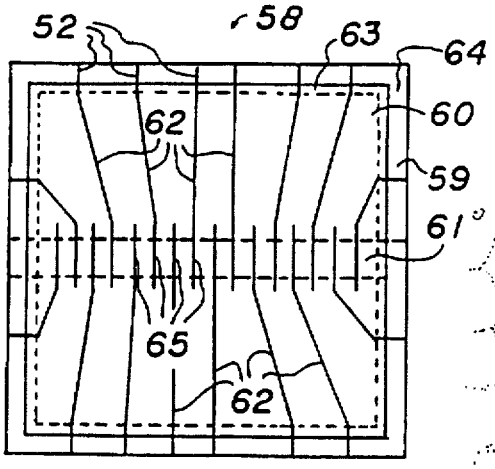
FIG. 6 is a view of an LCD layout utilizing a plurality of addressable parallel lines.

With reference to FIG. 6, an alternative to the pixel matrix display of FIGS. 3 and 5 is disclosed. Instead of having line segments consisting of rows and columns of pixels as in the previous device of FIGS. 3 and 5, the device of FIG. 6 is comprised of solid line segments 65. This alternative indicator element is shown generally as 58 and comprises a back plane 59, a front plane 60, deposited conductive back plane pattern 61 and deposited conductive front plane line segments 62. Front plane 60 is attached to back plane 59 by means of seal 63 around the periphery of front plane 60 in a manner well known in the art of LCD fabrication. Seal 63 also serves to seal in the liquid crystal material which is sandwiched between front and back planes 60 and 59. An outwardly extending portion around the periphery of back plane 59 serves as contact ledge 64 for interfacing indicator element 58 with conductive lines interconnecting indicator element 58 with interface 23 (FIG. 1).

The configuration of indicator element 58, shown in FIG. 6, is similar to that depicted in FIGS. 3 and 5 with the exception that indicator element 58 is considerably simpler to address since solid line segments 65–65 communicate with single contacts, whereas multiple edge contacts are required to form a line segment 47 or 48, each comprising a string of individual pixels, in the device of FIGS. 3 and 5. In indicator element 58 an entire line 65 corresponds to a single pixel 44 of the device of FIGS. 3 and 5.

When a controlling alternating voltage signal is addressed to the edge contact common with back plane conductive deposit pattern 61 and a corresponding signal is addressed to one of the plurality of front plane conductive lines 62, the associated line segment 65 is caused to become substantially opaque or clear, depending upon the orientation of polarizers associated with the LCD and is, thus, made visible to an operator. For this purpose personal computer 20 generates appropriate signals which are conditioned by interface 23 to generate the appropriate voltages.

It should be appreciated that, for specialized applications, lines 65 could be virtually any desired shape. For example, they could be in the form of nested progressive angles, concentric circles, progressive curves, and the like.

Thus, the device could easily be designed to perform any number of diverse and specific measurements.

Figure 7:
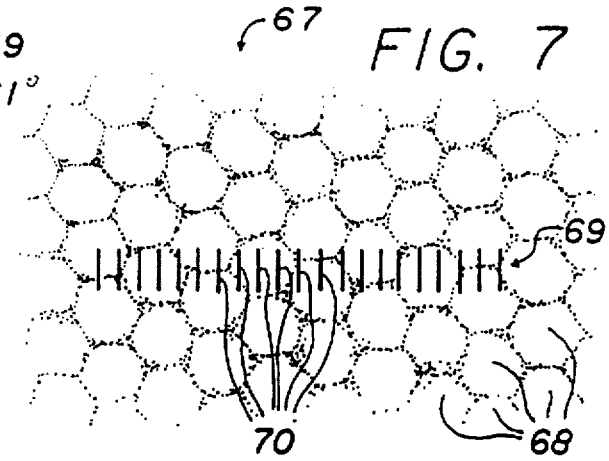
FIGS. 7–9 illustrate three stages of population density determination utilizing the device of FIG. 6 in an 'in vivo' biological measurement.
Figure 8:
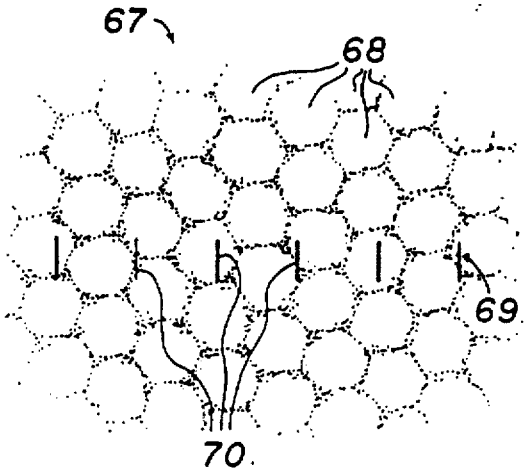
Figure 9:
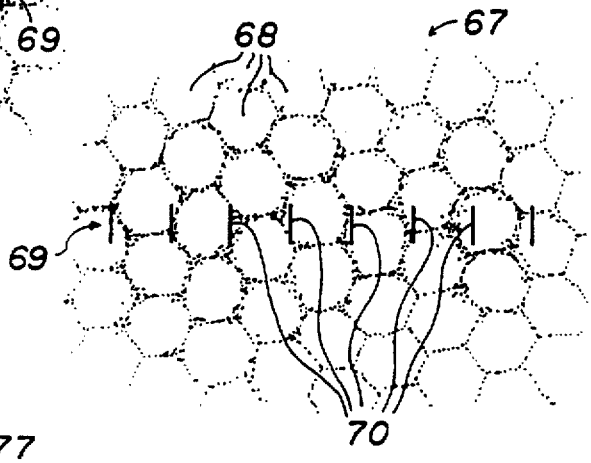

FIGS. 7–9 disclose a field of view of a device of the present invention equipped with the indicator element 58 of FIG. 6. Each of these three FIGS. 7–9 depicts a representation of the magnified image 67 of the endothelial cell layer of the human eye comprising individual cells 68. The endothelium is the undermost layer of the cornea and serves the very important function of isolating the cornea from the aqueous anterior chamber of the eye. Failure of the endothelium results in the invasion of moisture from the aqueous chamber into the cornea causing clouding of the cornea resulting in loss of vision. The endothelium is a single cell in depth and the regenerative biological systems of the body are incapable of producing them. A person is born with all he or she will ever have of these cells and as the years pass the cells slowly slough off, leaving voids to be filled by the remaining, healthy member of the cellular structure. Consequently, since the endothelium is only one cell in depth, as cells are lost the remaining cells must expand laterally to fill the resulting gaps. Thus, the size of the cells of the endothelium is directly related to the quantity of the remaining general population thereof. It is therefore desirable for the ophthalmologist, prior to operating upon the eye of a patient, to determine the pre-operative condition of the endothelium and, post-operatively, to once again gauge the condition of the cell layer to establish proof of the care and skill with which the operation was performed. This has become increasingly important to practicing ophthalmologists as the number of malpractice suits being brought in this, as in other medical arts, has been increasing in recent years.

In FIGS. 7–9, superimposed upon the image of cell layer 67 is line array 69. 'In vivo' measurements are naturally accompanied by a certain amount of movement of the living cell structure. Having a plurality of equally spaced electrically selectively addressable indicia eliminates the need for constant realignment of the apparatus, since differences in the spatial relationship between the plurality of indicia and the cell structure are readily discernible even when the image of the cell structure is relatively unstable. The effectiveness of this method can be simulated by looking, in rapid succession, at FIGS. 7–9. This simple experiment demonstrates the manner in which the instant device takes advantage of the intuitive capabilities of the human brain in its ability to instantaneously perceive relationships in visual patterns.

In such applications as the one described it would be a simple matter to provide a bonded and tamper-proof data storage means for the preservation of a permanent, legally viable, record, useful in the event of subsequent litigation.

FIG. 7 depicts line segment array area 69 comprising activated line elements 70 spaced closely at less than the width of cells 68. The spacing of the line segments is variable and controlled by means of manipulation by an operator of appropriate keys of personal computer 20 or the manipulation of input device 3 (FIG. 1). Given the situation depicted in FIG. 7, the operator would press the appropriate key, or manipulate input device 3, so as to actively sequence elements 70 to separate the addressed elements farther apart until their spacing matches that exhibited by the desired characteristic of the subject being evaluated.

FIG. 8 depicts line array area 69 comprising activated line elements 70 spaced widely at more than the width of cells 68. In this situation the operator would cause an opposite sequence to occur from the above example in order to cause line segments 70 to appear ever closer together until the proper relationship with the subject or subjects being evaluated is established.

FIG. 9 depicts line array area 69 comprising activated line elements 70 spaced properly relative to the width of cells 68 for the determination of the population density of the cell layer. The line arrays in FIGS. 7–9 are shown randomly positioned relative to cells 68 so as to illustrate the intuitive nature of matching line spacing to cell width. That is, the operator need not be overly concerned with maintaining precise alignment of lines to cell borden since, by sluing the spacing back and forth, the proper spacing will become apparent from the general overall visual effect of the combined images of lines and cells. As stated above, this fact facilitates 'in vivo' biological measurements wherein the cell sample exhibits a certain minimum amount of movement at almost all times.

Personal computer 20 (FIG. 1) may be readily programmed so as to calculate the actual cell population density based on the spacing of line segments 70. This it can dio in an ongoing fashion, displaying, perhaps in the periphery of the active area of the display as well as on a video monitor, the population figure in a manner well known in the art of digital displays as previously mentioned and depicted as display 44' in FIG. 5.

Figure 10:
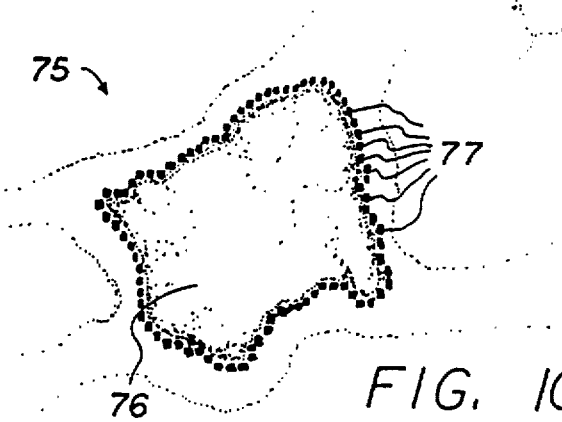
FIG. 10 is a view through the device of FIG. 3 in a mode for measuring an area of a subject.

Another mode of operation of dot matrix devices configured as described in FIGS. 3–5 is illustrated in FIG. 10. While the measurement parameters of interest in the earlier figures were cumulative count (FIG. 4) and linear distance (FIG. 5), in FIG. 10 the quantity desired is that of overall area of a subject. As described with reference to earlier modes of operation the personal computer is programmed to respond in a manner which particularly facilitates the measurement of overall area. In this case, the computer will produce a continuous line, in any form, in direct response to operator manipulation of input device 3 (FIG. 1). The operator may "erase" and redraw all or any portion of the line.

Once this continuous line completes an enclosure, the operator signals the computer that such is the case and the computer instantaneously calculates the area encompassed by the enclosure. Such an operation is depicted in FIG. 10 wherein a different and more greatly magnified image of a biological specimen 75 is generally depicted. A portion 76 of specimen 75 is shown completely surrounded by a continous stream of addressed pixels 77.

Subordinate areas within larger areas may be calculated and the areas of the individual enclosures displayed in a fashion similar to that depicted by numeric display 44' of FIG. 1. Calculation and display of the area remaining of a larger enclosure after one or more smaller enclosures within it are subtracted may also be made. For example, a space within another, larger, space may be computed and the areas and all values pertinent thereto may be displayed: overall area, overall area minus the area of the inner space, and the area of the inner space alone.

Other complex area measurements are also possible. All values may, or may not be, integrated with other significant data for further computations prior to the output of the results as third signals to suitable peripheral devices such as data storage device 7 and printer 9 (FIG. 1). Display of these values by activation of indicia of indicator 8 (FIG. 1), as previously discussed, may be provided so that computed values may be immediately viewable int he field of view of the apparatus without necessitating interruption of the operator's viewing of the subject.

Figure 11:
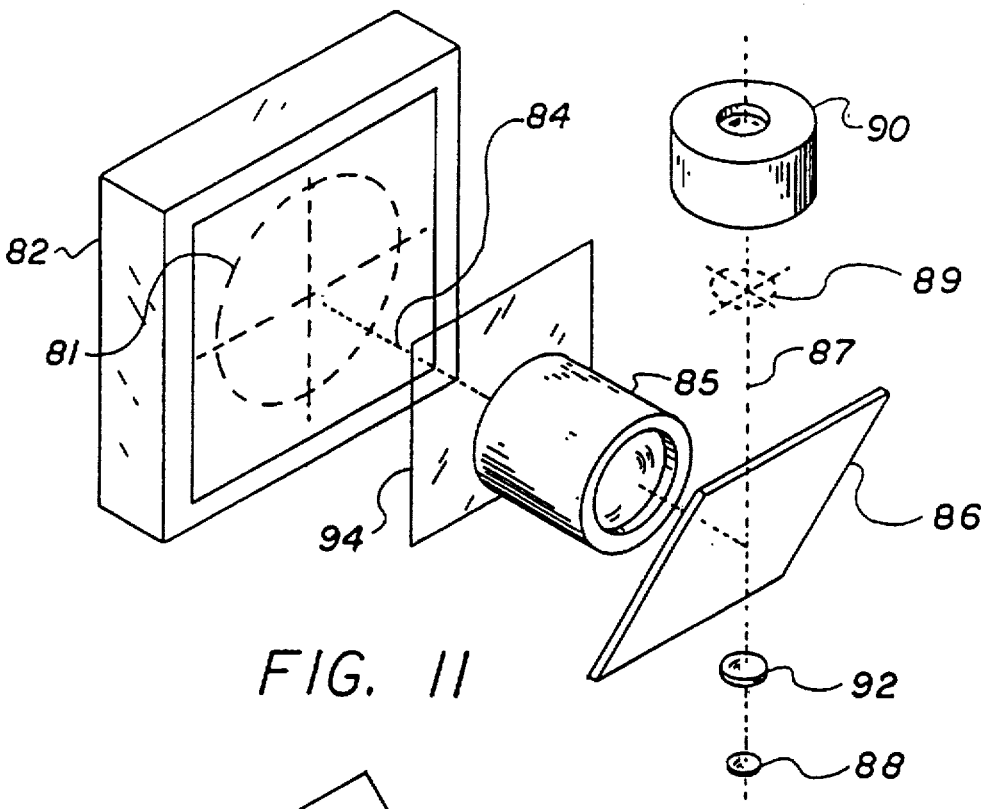
FIG. 11 is a perspective view of an alternative configuration for the device of FIG. 1 which utilizes an electroluminescent display and beamsplitting means to introduce an image of the display into the optical path of the apparatus.

FIG. 11 discloses an alternative structural configuration for devices of the present invention. Electroluminescent display panel 82 (hereinafter called EL panel 82) also functions by the cartesian coordinate system. However, when individual pixels of EL panel 82 are addressed they luminesce rather than becoming opaque or transparent. Examples of such panels currently available to the OEM market are the EL8358M and EL6648MX electroluminescent display monitors manufactured by Planar Systems, Inc., of Beaverton, Ore. A number of portable computers utilize display monitors of this type because their flatness, light weight and low power requirements are natural attributes in portable applications.

In the configuration shown in FIG. 11, the display of addressed pixels of EL panel 82, depicted as pattern 81, is optically reduced and focused by array imaging lens system 85. The resulting reduced image is redirected by beamsplitter 86 and focused upon plane 89. Plane 89 is also a plane of focus for ocular lens 90, objective lens 88, and intermediate lens 92. As mentioned, beamsplitter 86 serves to redirect optical path 84 of EL panel 82 for this purpose as well as to permit passage of optical path 87 of objective lens 88 and intermediate lens 92 for simultaneous viewing thereof on plane of focus 89 by an operator in combination with the image of addressed elements of EL panel 82, also being focused thereupon.

Optical axis 84 of array imaging lens system 85 is perpendicular to optical axis 87 of the main body of the device. Array imaging lens system 85 directs light emitted by EL plane 82 along axis 84 to beamsplitter 86 which redirects the light of optical axis 84 to ocular lens 90 on a path coincident with that of axis 87. Thus, the view through ocular lens 90 is a composite of the image of the subject being examined with that of images of selectively addressed elements of EL panel 82.

Transparent color between 94 may be employed to increase the contrast between the image of the subject being examined and the images of the addressed elements of the panel. Depending upon the hue of the filter used, the elements of EL panel 82, visible in the field of view of the apparatus, will appear as brightly colored transparent lines, dots, alphanumeric characters, and the like, superimposed upon the image of the subject.

It is to be understood that while optical axis 84 is shown and described as being perpendicular to optical axis 87, these components could, as well, be configured at angles other than ninety degrees. The only requirement would be that beamsplitter 86 be oriented to properly align optical axis 84 with optical axis 87. Indeed, optical axis 84 and its associated components could lie parallel with optical axis 87 with the addition of a front surface mirror by which means axis 84 could be redirected to beamsplitter 86.

In an alternate configuration, a recently developed device, the electrically-alterable high speed two-dimensionel spatial light modulator (hereinafter referred to as a modulator) would function well as an active display in place of EL panel 82. An example of a commercially available device of this type is available as Light-Mod. The Light-Mod is a magnetically-triggered device which, when once triggered on or off, remains in that condition indefinitely even when power is removed.

The surface of a Lite-Mod device is crisscrossed by deposited conductive lines in an X–Y Cartesian coordinate matrix (not depicted in FIG. 11). Each crossing of intersecting conductive lines communicates magnetically with a single element (mesa) of the device's dot matrix array. An individual pixel is either opaque or transparent depending upon the character of the last signals present at its X and Y coordinates. Unlike other opto-electronic devices, including LCDs, once a pixel of such a modulator is "set" to be opaque or transparent the drive signal may be removed with no resulting change in the state of the pixel. Power may be removed for any period of time, even years, and the display will remain permanently stable and readable. Thus, power is required only during periods of display updating.

Lite-Mod type devices must be accompanied by a backlighting source of illumination since they do not emit luminance as does an EL panel. An LCD component may be equally effectively configured in this fashion simply by reorienting the polarizers so that the unaddressed field is opaque and the addressed portions are transparent. Thus, in a device as depicted in FIG. 11, either a Lite-Mod device or an LCD could be used as an alternative to EL panel 82 with the addition of an illumination source for backlighting the device.

Imaging lens system 85 may serve to reduce the size of the image formed thereby relative to the size of the actual opto-electronic component so that the latter may be made larger than in previously described embodiments. This has the advantage that production tolerances of the larger unit could be much reduced.

Figure 12:
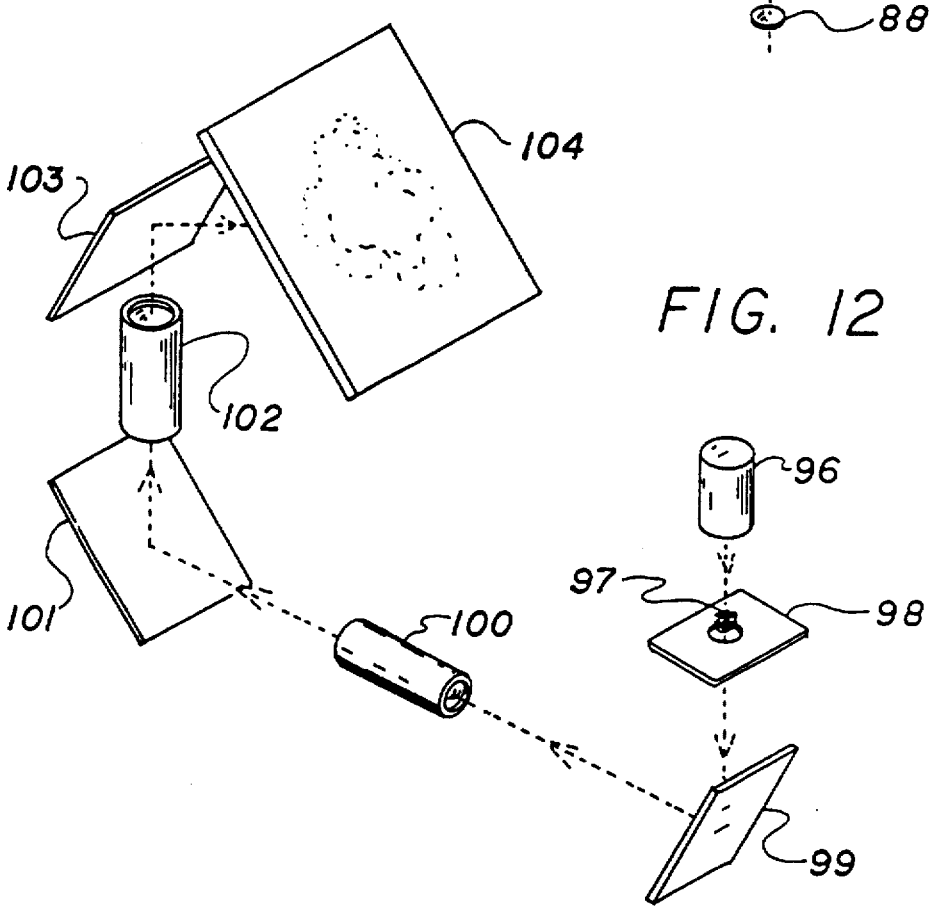
FIG. 12 is a perspective view of the instant invention embodied in the form of an optical projector.

FIG. 12 depicts yet another practical form the instant invention might assume-that of an optical projector. Prior art optical projectors have been available for many years, however, these devices have typically functioned similarly to measuring microscopes having only static reticles and patterned masks and utilizing controllably movable stages with calibrated control screws. The following paragraphs describe an alternative to the traditional methods by novel means in keeping with the spirit of the instant invention.

In FIG. 12, light source 96 provides the transmissive illumination required for operation of the device. Alternatively, a reflective arrangement could, instead, be provided for applications involving opaque examination subjects. Radiant energy from light source 96 passes through and around a subject 97 which has been placed upon stage 98 and is subsequently reflected by front surface mirror 99 to relay lens system 100 which relays an image of the illuminated subject to minor 101 and, thence, to projection lens system 102. The various mirrors in the system serve, collectively, to assure the operator will be presented an upright and unreversed image to facilitate operation of the device. In many applications a reversed image is acceptable and fewer mirrors would serve.

Projection lens system 102 magnifies the illuminated image of subject 97 and focuses it upon a plate coincident with the plane occupied by combination projection screen/opto-electronic indicator panel 104 (hereinafter referred to as indicator panel 104). Reflecting mirror 103 serves to direct the projected image to indicator panel 104.

An advantage of a device of this design is that the opto-electronic component of indicator panel 104 may be much larger than its counterpart in the previously described devices, thus making the interfacing of the many electrical connect points a straightforward matter.

Alternatively, indicator panel 104 could be disposed within the housing of the projector and an image of its array formed by a second imaging lens system which image then being introduced into the optical path of the projector by beamsplitting means and made coincident with the image of the subject in a fashion similar to that previously described with reference to the device of FIG. 11.

Referring to FIGS. 13 and 14, a further embodiment of the present invention is shown. The device has attached to it support arm 200 to which is mounted optical housing 202. Supported within housing 202, and axially aligned therein, are the ocular lens group 204, 204' and objective lens group 206, 206' which, together, constitute an optical magnifying device similar to a conventional microscope.

Disposed in axial alignment between ocular lens elements 204 and 204', and occupying the intermediate plane of focus of lenses is the opto-electronic indicator reticle 208 supported by support frame 209.

Interconnecting cable or flexcircuitry 210 connects opto-electronic indicator reticle 208 through the hollow interior of support arm 200 to row and column drive logic circuitry, which serves to drive opto-electronic indicator reticle 208. Signals output from computing means 222 are conveyed to drive circuitry 232 via parallel input/out interface 223. These signals are conditioned by drive circuitry 232 to properly activate selective elements of indicator 208.

Housing 202 has extended portion 212 in which is formed or cut a keyway (not shown) which matingly engages a key (not shown) on stationary support plate 213 of support arm 200 for vertical movement only of housing 202 to facilitate focusing of the apparatus. A common rack and pinion arrangement provides controlled vertical movement of housing 202 relative to apertured stage 214 for the focusing of the optics thereupon. Apertured stage 214 is mounted as shown upon support ann 200. Beneath apertured stage 214 is the mirror 215.

Base 205 not only functions as a support for the instrument but also acts as a housing for the various electronic components and their associated controls and data display. Data entry keypad 217, data display 219, reticle controller 220, and set switch 221 are provided. Switch 221 serves to set measurement parameters selected by an operator into memory and to set flags or counters relative to the image of the object being evaluated. Data entry keypad 217 may be of a conventional configuration, or may be otherwise, and is used to set variable operational parameters. Data display 219 is a standard LCD or LED multiple seven-segment digit display or the like. Reticle controller 220 and set switch 221 may be mounted in accordance with the natural positions of an operator's hand for ease of operation.

Reticle controller 220 may be an analog signal producing device utilizing a pair of potentiometers, one for the X channel and one for the Y channel. The values of these two signals, when taken together, define any selectable position syllable within the active area of opto-electronic indicator reticle 208 in a manner well known in the art of electronics. The values of the settings of the X and Y potentiometers are conveyed to data memory 226 and, hence, to computing means 222 for the control of moving pixels, dots, lines, or bars of opto-electronic indicator reticle 208.

Reticle controller 220 may, in an alternative form, comprise a set of four conventional on/off switches. The logical on/off positions of these switches would be interpreted by computing means 222 as imperatives for activation of elements of opto-electronic indicator reticle 208. Computing means 222 is configured to scan the input signals from reticle controller 220 to determine the logic levels of the signals coming therefrom in a manner well known in the art of digital logic design in order to properly activate the elements of indicator reticle 208.

There are numerous other means by which reticle control signals may be produced and utilized by computing means 222 for reticle control. However, the two means described above sufficiently illustrate how this task might be performed by means commonly available in the art.

With reference now to the hardware and circuitry shown by block diagram in FIG. 14, the subsections of computing means are depicted integrally interconnected by a common internal bus as indicated by arrows in FIG. 14. Program memory 218 contains the readonly data which controls the computational functions of the apparatus. Data memory 226 contains randomly accessible data which is constantly updated as additional data is input into it by the various data input devices via data bus 224 and parallel input/output interface 223. Both memories 218 and 226 communicate their data to data processor 227 which, after performing appropriate computations based on that data, communicates the results of these computations to parallel input/output interface 223 which, in turn, communicates the data to data display 219 via data bus 224 and to optoelectronic indicator reticle 208 via data bus 224 and row/column drive circuitry.

Data pertaining to particular operations to be performed are input into computing means 222 by a number of means via data bus 224. Among the devices which input data into data bus 224 are keypad 217, proportional reticle controller 220, set switch 221 and magnification level detector 228.

Detector 228 monitors the setting of the magnification altering optical group 229 in devices of the present invention so equipped and may be a variable resistor producing a variable analog output signal. Changes in the positioning of the elements of magnification altering optical group 229 cause proportionate changes in the signal from magnification level detector 228 which are conducted to computing means 222 via data bus 224. These changes are integrated by computing means 222 into subsequent computations having to do with measurements of object size, distance span, or other quantitative parameters to be measured, in order to compensate for changes in image magnification in devices of the present invention which embody this feature.

Magnification altering optical group 229 and detector 228 could alternatively be configured to operate in increments of predetermined magnification levels. In such a case a detector 229 could comprise a series of on/off switches which would produce a different logic signal for each magnification setting. Computing means 22 would, of course,. monitor the signals produced by detector 228 so that computations done thereby would be compensatory of changes in magnification levels.

Row and column drive logic circuitry 232 interconnects with opto-electrontic indicator reticle 208 as previously discussed with reference to FIG. 1. Row and column drive logic circuitry 232 may comprise one or more dot matrix LCD drivers such as Hughes Aircraft Company's HLCD 0540. Two or more of these drivers may be cascaded to increase the number or controlled reticle locations as would be required in a complex dot matrix display. Descriptive data on the HLCD 0540 is included herewith as reference. The HLCD 0540 is a 232 row or column, serial input, dot matrix LCD driver designed to be controlled by any one of a number of currently available microcomputers such as Intel Corporation's 80C49. The 80C49 is a very low power CMOS device with 2K bytes of mask programmable ROM (program memory) and 128 bytes of user-programmable RAM (data memory) making it ideal for application in devices of the present invention. Descriptive data on the 80C249 are also included herewith as reference.

Also shown in their relationships with magnification altering optical group 229 are ocular lens 204, objective lens 206', and apertured stage 214.

While the invention has been illustrated and described in detail in the drawings and foregoing description such is not to be construed as restrictive since it should be understood that only preferred embodiments have been shown and described and that all changes and modifications which come within the spirit of the invention are desired to be protected by U.S. Patent. For example, it should be understood that while the embodiments described constitute optical microscopes and projectors, devices of the present invention might equally well be embodied in electron microscopes, telescopes, binoculars, surveyor's transits, magnifiers, optical comparators, and other such intruments.

The device can also be used to mask by selection of pixels to optically eliminate one or more features from the field of view.

What is claimed is:

1. An optical instrument for examining and evaluating a specimen wherein the instrument has an optical axis, comprising:

means mounted on said optical axis of the instrument for producing an image of the specimen on a plane of focus disposed on said optical axis;

opto-electronic indicator means mounted within the instrument on said optical axis for generating a multiplicity of electrically-addressable indicia which are visible on said plane of focus on the optical axis of the instrument for simultaneous viewing with the image of the specimen; and processor means for selectively addressing each of said indicia to cause said indicia to become visible on said plane of focus for viewing thereon With the specimen and for processing the addresses of the selected indicia to define a relationship between the selected india and the specimen.

2. An optical instrument according to claim 1 in which the indicia are each transformable between a condition of transparency and a condition of opacity in response to control signals from the processor means.

3. Apparatus for forming an image of a subject viewable by an operator for interfacing with a computer for making quantitative evaluations pertinent to an image formed thereby, comprising:

a housing;

means within the housing for forming an image of a subject for examination thereof by an operator, the image forming means being disposed on an image path through the housing;

a plane of focus within the housing located on said image path and upon which an image of the subject is formable for viewing by an operator;

an electrically addressable opto-electronic indicator mounted within the housing on said image path in such a manner that selected indicia are generated by the opto-electronic indicator on said plane of focus and may be selected by the operator for viewing on said plane of focus together the image of the subject; and means for electrically addressing the optoelectronic indicator so that the operator may selectively address particular indicia thereof to cause them to be generated and viewable on said plane of focus together with the image of the subject.

4. Apparatus as set forth in claim 3, wherein:

the opto-electronic indicator has a planar field upon which a multiplicity of individually electrically addressable indicia are arrayed and controllably selectable by an operator so as to be made to relate in a quantitative manner to an image of a subject formed by the apparatus, the individual indicia being visible only when being selectively electrically addressed while otherwise appearing substantially invisible.

5. Apparatus as set forth in claim 4 wherein:

the planar field is arrayed in the form of a Cartesian coordinate matrix comprising a multiplicity of individually electrically addressed pixels, each of which is individually addressable so as to be made to respond to the second signals output by the computing means to be made visible to an operator when electrically addressed and to be substantially invisible when not being so addressed, images of the addressed indicia being visible superimposed upon the image of a subject for simultaneous viewing therewith so as to relate thereto in a manner to facilitate the quantitative evaluation of a characteristic of the subject.

6. Apparatus as set forth in claim 5, wherein:

the means for computing is further programmed to output third signals to peripheral means for display, and wherein the apparatus further comprises, means for peripheral display to receive the third signals and for display of data pertinent to the quantitative evaluations being performed by the apparatus.

7. Apparatus as set forth in claim 4 wherein:

the means for computing is further programmed to output third signals to selected portions of the optoelectronic indicator array so as to cause those portions to display data relating to results of computations and other values pertaining to the indicia addressed relative to features exhibited in the image of the subject for viewing by an operator simultaneously therewith.

8. Apparatus as set forth in claim 4,and further comprising:

means for peripheral input associated with the computing means for facilitating input into the computing means for facilitating input into the computing means of first signals by an operator to affect the character of the information output by the computing means and subsequently displayed by the optoelectronic indicator relative to the image of a subject under evaluation therewith.

9. Apparatus as set forth in claim 4, wherein:

the addressable indicia are in a form selected from the group consisting of concentric circles, nested progressive angles, and arcs for selective quantitative comparisons with images of subjects to be evaluated.

10. Apparatus as set forth in claim 4, wherein:

the apparatus is responsive to more than one set of parameters for use in making evaluations of images of multiple subjects.

11. Apparatus as set forth in claim 10, wherein:

the means for setting the parameters of measurement comprises programming associated with the computing means which provides for selection from more than one set of parameters for use in performing quantitative evaluation relating to multiple subjects.

12. Apparatus as set forth in claim 4, wherein:

the selectively addressable indicia are formed for spanning an image of a subject for measuring a dimension pertinent thereto, which dimension is subsequently computed by the computing means.

13. Apparatus as set forth in claim 4, wherein:

the addressable indicia are in the form of a plurality of spaced parallel lines addressable by an operator so as to form a plurality of viewable equidistantly spaced lines, the intervals among which may be made to appear to increase or decrease depending upon which lines are addressed so that the apparent space therebetween may be made to relate to the occurrences of boundaries in a subject which is itself composed of a multiplicity of similarly sized and intimately organized units, such as biological cell populations, for the purpose of determining a quantitative value relating thereto, such as cell population density, and the like.

14. Apparatus as set forth in claim 3 and further comprising:

means for computing having means for input to facilitate the input of first electrical signals by an operator and means for output connected to the optoelectronic indicator by which second electrical signals are output by the computing means to the opto-electronic indicator in response to the first signals input by an operator, and means for programming to control the operation of the computing means so as to cause the computing means to output second electrical signals to the opto-electronic indicator for electrically addressing selected indicia thereof relative to an operator's input of first signals, and to cause the computing means to perform computations based on the particular second signals being output to the optoelectronic indicator so as to relate the second signals to particular quantitative conditions existent in the subject being evaluated and to output third signals pertinent to the results of the computations made thereby relating to the quantitative futures thus exhibited by the subject.

15. Apparatus as set forth in claim 2, wherein:

the opto-electronic indicator is disposed upon the image path of the apparatus, the planar field thereof being substantially coincident with the image path of the apparatus for simultaneous viewing of visible selectively electrically addressed indicia thereof together with an image of the subject; and wherein.

indicia of the opto-electronic indicator have two selectable states, in one state the indicia appearing substantially transparent while in the other state appearing substantially opaque.

16. In an optical microscope having a compound optical system for forming a magnified image of a microscopic subject for the quantitative analysis thereof, an improved controllable active quantitative measuring apparatus comprising:

an opto-electronic indicator mounted on an optical axis of the microscope and having an image plane coincident with a plane of focus located on said optical axis of the microscope for generating on said image plane selected members of a multiplicity of electrically addressable indicia which, when addressed, form images which are viewable on said optical axis by an operator together with an image of a subject being examined therewith;

means for interfacing the opto-electronic indicator with a computer and its associated peripheral devices to provide input signals to the indicator in response to control signals input into the computer by an operator for addressing selected indicia of the optoelectronic indicator relative to a quantitative value associated with and exhibited in the image of the subject being examined therewith; and means for programming in association with the computer to generate the input signals and control signals and operations for performing quantitative evaluations relating to the image of the indicia and the subject being examined.

17. Apparatus as set forth in claim 16, wherein:

the compound optical system is variable by an operator to alter the degree of magnification of the image of a subject being examined therewith; wherein the apparatus further comprises;

means for controlling the variable optical system for causing controlled changes in the degree of magnification of the apparatus; and means for sensing associated with the variable optical system and communicating with the computer to affect computations performed thereby so as to make the computations responsive to changes in the size of the image of the subject formed by the apparatus so that the computations are compensatory of changes in image size.

18. A method for making quantitative evaluations of an image of a subject formed by a microscope in combination with a computer which comprises:

placing the field of view of an opto-electronic indicator on an active axis of the microscope for generating images of controllably selectively viewable indicia upon the image of the subject formed by a lens system of the microscope mounted on said active axis for simultaneous viewing of the subject and said indicia on a common plane of focus located on said active axis of the instrument;

selecting members of the indicia to be made viewable so that they relate quantitatively to the image of the subject in a systematic manner to span, mark, encompass, or delineate the image of the subject;

causing the selected members of the indicia to be evaluated by the computer so that the computer calculates results relating to a quantitative value such as distance, area, or quantity per unit measure; and displaying the results of the calculations to the operator.

* * * * *